(12) United States Patent
Ramesh Kumar et al.

(10) Patent No.: US 10,812,473 B2
(45) Date of Patent: Oct. 20, 2020

(54) AUTO INLINE ENROLLMENT OF TIME-BASED ONE-TIME PASSWORD (TOTP) FOR MULTI-FACTOR AUTHENTICATION

(71) Applicant: Oracle International Corporation, Redwood Shores, CA (US)

(72) Inventors: Pruthvithej Ramesh Kumar, Bangalore (IN); Nagaraj Pattar, Gulbarga (IN); Samanvitha Kumar, Bangalore (IN); Parthipan Kandasamy, Tiruppur (IN); Ashok Kumar Subbaiyan, Tiruppur (IN)

(73) Assignee: Oracle International Corporation, Redwood Shores, CA (US)

( * ) Notice: Subject to any disclaimer, the term of this patent is extended or adjusted under 35 U.S.C. 154(b) by 164 days.

(21) Appl. No.: 16/163,468

(22) Filed: Oct. 17, 2018

(65) Prior Publication Data

US 2019/0386981 A1 Dec. 19, 2019

(30) Foreign Application Priority Data

Jun. 15, 2018 (IN) .............................. 201841022424

(51) Int. Cl.
*H04L 29/06* (2006.01)
*H04L 9/08* (2006.01)
(Continued)

(52) U.S. Cl.
CPC .......... *H04L 63/0838* (2013.01); *G06F 21/31* (2013.01); *G06F 21/34* (2013.01);
(Continued)

(58) Field of Classification Search
CPC .......... G06F 21/34; G06F 21/30; G06F 21/31; H04L 63/08; H04L 63/083;
(Continued)

(56) References Cited

U.S. PATENT DOCUMENTS 8,627,438 B1 1/2014 Bhimanaik
8,924,712 B2 12/2014 Varadarajan et al.
(Continued)

OTHER PUBLICATIONS

Alforque et al., Azure Active Directory Integration with MDM, Microsoft Docs, Retrieved from the Internet: https://docs.microsoft.com/en-us/windows/client-management/mdm/azure-active-directory-integration-with-mdm, Sep. 5, 2017, 39 pages.
(Continued)

*Primary Examiner* — Edward Zee
(74) *Attorney, Agent, or Firm* — Kilpatrick Townsend & Stockton LLP

(57) ABSTRACT

Techniques are described for enrolling an authentication device for generating time-based one-time passwords (TOTPs) for use with multi-factor authentication (MFA). A user is prompted to initiate an enrollment procedure after successful authentication based on a first authentication factor in connection with a request for a resource protected by an access management (AM) system. The authentication device contacts the AM system to establish that the authentication device is a trusted device (e.g., through validation of an authentication token contained in a Quick Response (QR) code generated by the AM system). After the authentication device has been established as a trusted device, the AM system sends a shared secret to the authentication device, which uses the shared secret to complete enrollment (e.g., by generating a TOTP for verification by the AM system). A session is then created for the user to enable access to the protected resource.

20 Claims, 9 Drawing Sheets

(51) Int. Cl.
*G06F 21/31* (2013.01)
*G06F 21/34* (2013.01)

(52) U.S. Cl.
CPC .......... *H04L 9/085* (2013.01); *H04L 63/0846* (2013.01); *H04L 63/0853* (2013.01); *H04L 63/0876* (2013.01); *H04L 63/205* (2013.01); *H04L 2463/082* (2013.01); *H04L 2463/121* (2013.01)

(58) Field of Classification Search
CPC ............. H04L 63/0838; H04L 63/0846; H04L 63/0853; H04L 9/0861; H04L 9/0863; H04L 9/0877
See application file for complete search history.

(56) References Cited

U.S. PATENT DOCUMENTS

| | | | |
|---|---|---|---|
| 9,021,565 | B2 | 4/2015 | Novack et al. |
| 9,055,029 | B2 | 6/2015 | Narendra et al. |
| 9,332,008 | B2 | 5/2016 | Burch et al. |
| 9,374,369 | B2 | 6/2016 | Mahaffey et al. |
| 9,443,073 | B2 | 9/2016 | Oberheide et al. |
| 9,547,756 | B2 | 1/2017 | Durbha et al. |
| 2005/0021975 | A1 | 1/2005 | Liu |
| 2011/0113245 | A1* | 5/2011 | Varadarajan ......... G06Q 20/385 713/168 |
| 2014/0189808 | A1 | 7/2014 | Mahaffey et al. |
| 2014/0365780 | A1* | 12/2014 | Movassaghi ........ H04L 63/0838 713/184 |
| 2015/0150109 | A1 | 5/2015 | Bocanegra et al. |
| 2015/0281222 | A1* | 10/2015 | Burch ................. H04L 63/0846 726/6 |
| 2016/0057146 | A1 | 2/2016 | Little et al. |
| 2016/0269403 | A1 | 9/2016 | Koutenaei et al. |
| 2017/0331801 | A1 | 11/2017 | Mezei et al. |

OTHER PUBLICATIONS

Configuring the Time-Based One-Time Password (TOTP) Tool for Two-Factor Authentication Using Google Authenticator, Retrieved from the Internet: https://www.netiq.com/documentation/cloudaccess-2-2/install_config/data/config-otp.html?view=print, Retrieved Jun. 6, 2018, 8 pages.

Instructions for Enrolling a New MFA Device, Retrieved from the Internet: https://its.yale.edu/site 088325-1091402s/default/files/imce /pdfs/MFA% 20Adding%20a%20new%20device%2008312015. pdf, Aug. 31, 2015, 3 pages.

MAadhaar Application—All You Need to Know, All Digital Tricks, Retrieved from the Internet: https://www.alldigitaltricks.com/maadhaar-application-all-you-need-to-know/, Jul. 19, 2017, 2 pages.

Sarma, Second Level Authentication Using QR Codes, International Journal of Computer and Internet Security, ISSN 0974-2247, vol. 5, No. 2, 2013, pp. 43-50.

U.S. Appl. No. 15/959,806, filed Apr. 23, 2018, 133 pages.

* cited by examiner

AUTO INLINE ENROLLMENT OF TIME-BASED ONE-TIME PASSWORD (TOTP) FOR MULTI-FACTOR AUTHENTICATION

CROSS-REFERENCES TO RELATED APPLICATIONS

The present application claims the benefit and priority of Indian Provisional Application No. 201841022424, filed Jun. 15, 2018, entitled "Auto Enrollment for Time-Based One-Time Password". The contents of Indian Provisional Application No. 201841022424 is incorporated herein by reference in its entirety for all purposes.

BACKGROUND

Multi-Factor authentication (MFA) is becoming a popular way to add additional security to protect user accounts from thefts and data breaches. MFA requires two or more items of evidence (known as factors) in order to successfully authenticate a user. A factor can be something that the user knows (e.g., a password) or something that the user possesses (e.g., a security token).

One way to introduce a factor into an MFA process is to use an authentication device for generating a security code, e.g., an authentication device running a software application that generates a time-based one-time password (TOTP). A TOTP can be a time varying passcode that is generated based on a shared secret. A TOTP can, for example, be a random number generated as a function of a secret shared between the device generating the TOTP and a device that verifies the TOTP, and further as a function of time (e.g., the local time of the authentication device). A user attempting to authenticate may be required provide a first authentication factor in combination with the TOTP generated by the authentication device in the user's possession. Software authentication devices are gaining traction for providing MFA and are becoming more popular due to their simplicity and less dependency on third party software and hardware. For example, an authentication service provider may choose to make an authentication application available for download onto a user's mobile device (e.g., a smartphone) to enable the mobile device to function as a software authentication device.

A major challenge with software authentication devices is the process for enrolling an authentication device with an authentication service provider. Enrollment is also referred to herein as registration. For example, in order to set up an authentication device for generating TOTPs, a user is often required to manually input information obtained during registration of the authentication device (e.g., typing a TOTP generated by the authentication device based on a shared secret contained in a Quick Response (QR) code provided by the authentication service provider). The user has to manually input the TOTP so that the authentication service provider's system can verify that the authentication device and the authentication service provider are time-synchronized and can therefore generate the same passcodes.

If the authentication device and the authentication service provider are not time-synchronized with each other, the TOTP generated by the authentication device may be different from the TOTP generated by the authentication service provider, resulting in a failure to verify the authentication device's TOTP against the TOTP generated by the authentication service provider. The user is responsible for synchronizing the time on the authentication device with the time on the authentication service provider's system. Thus, the registration process is time consuming and error prone. Due to errors, the user may make multiple attempts to complete enrollment, which could result in locking of the user's account from accessing a requested resource and a need technical support or waiting for a certain amount of time to expire before the user's account is unlocked. The need for user intervention may even lead some users to give up on attempting to register their devices for use with MFA. If the user gives up, this makes the user account unsecure since the user will be relying on a single authentication factor (assuming single factor authentication is permitted).

BRIEF SUMMARY

The present disclosure relates generally to enrolling an authentication device for generating TOTPs for use with MFA. More particularly, techniques are described for enabling an authentication device to be enrolled with minimal user involvement. For example, user input can be limited to instructing the authentication device to contact an access management (AM) system, e.g., by scanning a QR code containing a Uniform Resource Locator (URL) that directs the authentication device to an AM server within the AM system. The user may be prompted to initiate the enrollment procedure after successful authentication of the user by the AM system based on a first authentication factor (e.g., a username and/or password) supplied through a primary device (e.g., a personal computer running a Web browser). The authentication may be performed in connection with a request from the primary device for a resource protected by the AM system. The authentication device then contacts the AM system to establish that the authentication device is a trusted device (e.g., through validation of an authentication token that is contained in the QR code and subsequently presented back to the AM system by the authentication device). The authentication token can be validated, for example, by confirming the authenticity of the token (e.g., based on the presence of a signature belonging to the AM system) and the correctness of information (e.g., information about the user and/or the AM system) contained in the token.

After the authentication device has been established as a trusted device, the AM system may send a shared secret to the authentication device to enable the authentication device to begin generating TOTPs for the user. The authentication device may then generate and send a TOTP to the AM system to enable the AM system to complete enrollment after first verifying the TOTP. Additionally, after the authentication device is enrolled, a session may be created for the user (e.g., using an authorization procedure in which a session cookie or access token is generated). Once the session has been created, the user can access the earlier requested resource and other protected resources without having to re-authenticate during the session.

In certain embodiments, a shared secret is sent from an AM system to an authentication device without requiring the user to manually input the shared secret. This is in contrast to conventional enrollment techniques where the user inputs the shared secret by, for example, scanning a QR code containing the shared secret. In some embodiments, QR codes are used for initiating contact between the authentication device and the AM system (e.g., through a URL embedded in the QR code) and/or for transmitting an authentication token used for establishing that the authentication device is a trusted device. In this manner, the shared secret is securely sent to the authentication device, bypassing the need to send the shared secret to the user's primary device.

Certain embodiments involve automated backend communications between an authentication device and an AM system for enrollment verification without involving the user's primary device and/or without involving the user's Web browser. Enrollment verification can include one or more checks performed by the authentication device to confirm that the authentication device is complaint with an authentication policy of the AM system (e.g., checking whether the operating system and authentication application running on the authentication device meet minimum version requirements, whether the authentication device or authentication application are password protected, etc.). The transmission of a shared secret from the AM system to the authentication device may be conditioned upon the authentication device being compliant with the authentication policy. Upon receiving the shared secret, the authentication device can generate a TOTP based on the shared secret and send the TOTP to the AM system for verification against a TOTP generated by the AM system using the same shared secret.

In certain embodiments, to ensure that the authentication device and the AM system are time-synchronized, the AM system may send time information (e.g., a timestamp) to the authentication device. The authentication device may then compare the time information to corresponding time information on the authentication device to check whether the times match to within a threshold time deviation (e.g., a maximum allowable deviation of thirty seconds). If the threshold time deviation is exceeded, the authentication device may prompt the user to manually correct the time on the authentication device. Alternatively, the authentication device may automatically correct the time by, for example, adopting the time of the AM system (e.g., based on the received time information) or by calibrating against an external time reference (e.g., a global positioning system (GPS) or an Internet based time server).

In certain embodiments, an AM system is configured to receive an enrollment request from an authentication device of a user, the enrollment request including an authentication token generated by the access management system in response to a successful authentication based on a first authentication request for the user. The AM system is further configured to validate the authentication token. The AM system sends a shared secret to the authentication device in response to the validation of the authentication token. After sending the shared secret, the AM system receives a first passcode from the authentication device, the first passcode being generated and sent by the authentication device in response to receiving the shared secret from the AM system. The AM system is further configured to generate a second passcode using the shared secret and compare the first passcode to the second passcode. Responsive to determining that the first passcode matches the second passcode, the AM system enrolls the authentication device. The enrolling comprises granting permission for the authentication device to generate passcodes in connection with subsequent authentication requests for the user.

Certain embodiments disclosed herein may be implemented on a computer system that is configured to implement methods and operations disclosed herein. Certain embodiments relate to systems, computer products, and computer-readable storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, computer-readable storage media, modules, or a combination thereof to perform methods and operations disclosed herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The foregoing, together with other features and embodiments, will become more apparent upon referring to the following specification, claims, and accompanying drawings.

DETAILED DESCRIPTION

Figure 1:
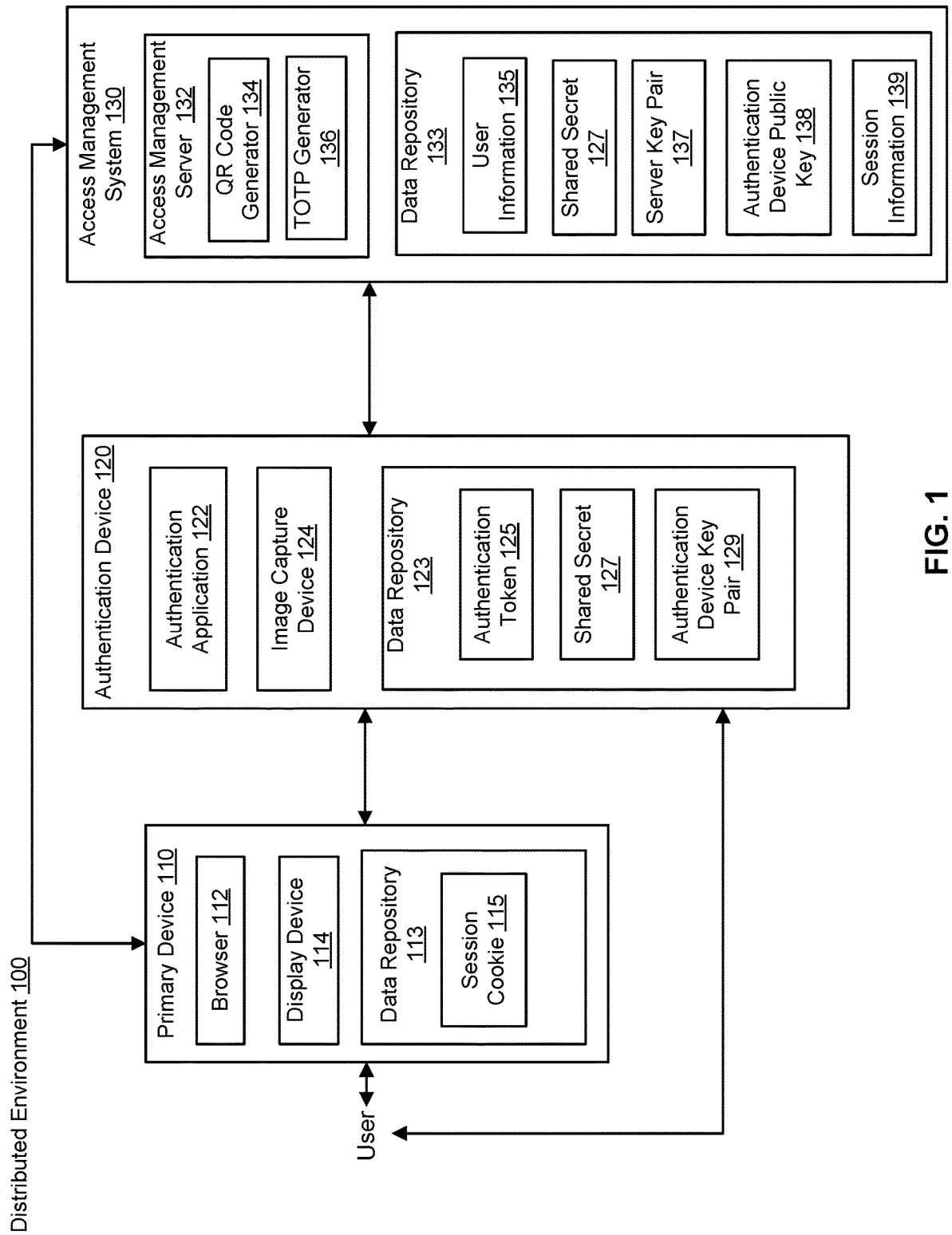
FIG. 1 is a simplified block diagram of a distributed environment incorporating an exemplary embodiment.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Systems depicted in some of the figures may be provided in various configurations. In certain embodiments, the systems may be configured as a distributed system where one or more components of the system are distributed across one or more networks in a cloud computing system. In certain embodiments, the systems may be configured to operate in virtual or non-virtual environments.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a non-transitory computer-readable storage medium. A processor(s) may perform the necessary tasks.

Networks of computer systems, such as an enterprise computer network, may be used to meet the computing needs of organizations, such as businesses, universities, government organizations, or the like. A computer network infrastructure may be spread over one or more data centers that may be dispersed over different geographic locations. Various resources included within a computer network may be managed and/or stored by the one or more data centers. Resources may include any item managed and/or stored by the data centers and available for access by one or more users. Such items include files (such as documents, spreadsheets, and images), computational resources (such as processing power, cloud storage, and network communication bandwidth), software applications, and/or the like. A resource may be protected or unprotected. If a resource is protected, a user may need to be authenticated and authorized in order to access the resource.

In some embodiments, a resource is protected by an AM system comprising one or more AM servers configured to grant access to the resource in response to successful multi-factor authentication of the user. In order to participate in MFA, the user may be required to enroll a computing device as an authentication device with the AM system. The user may choose to use one computing device as a primary device (e.g., a desktop computer running a Web browser that is used for requesting access to the resource and for user input of authentication factors) while using a second computing device as the authentication device (e.g., a mobile device running an authentication application that generates and displays the secondary authentication factor to the user). Alternatively the primary device and the authentication device may be a single computing device (e.g., a desktop or mobile computer running both a Web browser and an authentication application).

The present disclosure describes techniques for enrolling, with minimal user involvement, an authentication device for generating TOTPs for use with MFA. For example, user input can be limited to instructing the authentication device to contact an AM server. The enrollment procedure can be performed in connection with an access request for a resource protected by the AM server, in situations where no authentication device has been previously enrolled for the user. After successfully authenticating the user based on a first authentication factor (e.g., a username and/or password), the AM server can initiate the enrollment procedure by, for example, generating and sending a QR code to a Web browser or other application running on the user's primary device. The QR code can be displayed on the user's primary device and may include an authentication token (e.g., a JavaScript Object Notation (JSON) Web Token (JWT)). The QR code may further include a resource link (e.g., a URL) that directs to the AM server.

In certain embodiments, the user may instruct the authentication device to contact the AM server by, for example, scanning the QR code using an image capture device (e.g., a camera or barcode scanner) coupled to or located on the authentication device, whereupon scanning the QR code the authentication device will automatically extract the URL from the QR code to contact the AM server. Alternatively, the user can open the URL on the authentication device, e.g., by sending the URL to the authentication device in an email or text message. The authentication device then contacts the AM server to establish that the authentication device is a trusted device, e.g., through validation of the authentication token.

After the authentication device has been established as a trusted device, the AM server sends a shared secret to the authentication device to enable the authentication device to begin generating TOTPs for the user. The authentication device may then generate and send a TOTP to the AM server to enable the AM server to verify the TOTP received from the authentication device before completing enrollment. After the authentication device is enrolled, a session may be created for the user (e.g., using an authorization procedure in which a session cookie or access token is generated). Once the session has been created, the AM server may allow the user to access the earlier requested resource in addition to accessing other protected resources without having to re-authenticate, so long as the session remains valid. If the user needs to re-authenticate, the AM server may require user input of a TOTP generated using the shared secret.

FIG. 1 is a simplified block diagram of a distributed environment 100 incorporating an exemplary embodiment. Distributed environment 100 may comprise multiple systems or computing devices communicatively coupled to each other via one or more communication networks (not shown). The systems and computing devices in FIG. 1 include one or more primary devices 110, one or more authentication devices 120, and an AM system 130 communicatively coupled to each other via one or more communication networks. Distributed environment 100 depicted in FIG. 1 is merely an example and is not intended to unduly limit the scope of claimed embodiments. One of ordinary skill in the art would recognize many possible variations, alternatives, and modifications. For example, in some implementations, distributed environment 100 may have more or fewer systems or devices than those shown in FIG. 1, may combine two or more systems or devices, or may have a different configuration or arrangement of systems or devices.

A communication network that couples systems or devices of FIG. 1 can be of various types. Examples of a communication network include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as the Institute of Electrical and Electronics (IEEE) 802.XX suite of protocols, TCP/IP, IPX, SAN, AppleTalk®, Bluetooth®, and other protocols. In general, a communication network may include any infrastructure that facilitates communications between the various components depicted in FIG. 1.

Each of the systems and computing devices in FIG. 1 may include a data processing component (e.g., one or more processors) and one or more memory resources (e.g., volatile and/or non-volatile memory). Processors may include single or multicore processors. Processors may include general purpose microprocessors such as ones provided by Intel®, AMD®, ARM®, Freescale Semiconductor, Inc., and the like, that operate under the control of software stored in associated memory. Memory resources may be provided for storing instructions and/or data associated with an operating system and applications or processes executed by the processors. For convenience, memory resources are depicted in FIG. 1 as data repositories, with each computing device or system having a single repository. However, other memory resource configurations are also possible.

The primary device 110 can be any computing device configured for initiating primary authentication of a user in connection with an MFA process and in the manner described herein. For example, primary device 110 may be a desktop or laptop running a Web browser 112 or some other application through which the user supplies a primary authentication factor (e.g., a username and/or a password, or some other knowledge based factor) to the AM system 130. Using the primary device 110, the user may request access to a resource protected by the AM system 130. The protected resource can be any of the resources mentioned earlier including, for example, files, documents, or applications. The protected resource may be stored in any number of locations, for example, in a data repository of the AM system 130 or on a cloud server.

In response to the access request, the AM system 130 may request the primary authentication factor from the user. Upon successful authentication based on the primary authentication factor, the AM system 130 may request a second authentication factor (e.g., a TOTP) if the user has previously enrolled an authentication device with the AM system 130. If the user successfully authenticates based on the second authentication factor, the AM system 130 may then grant access to the protected resource (assuming that the user has been authorized to access the protected resource). In this context, the primary authentication factor is simply the first authentication factor requested by the AM system and not necessarily the most important factor.

In some embodiments, an access request from the primary device 110 is intercepted by an AM agent (e.g., a Web gate) that redirects the request to the AM system 130. The request may be received by a load balancer (not shown) that selects an AM server to send the request to for processing. Multiple AM servers may be available for processing access requests. For example, AM servers can be located in one or more data centers in the AM system 130.

The primary device 110 may include a display device 114 for visual output of information in connection with enrollment or resource access. For example, the display device 114 may, under the control of the browser 112, display a QR code to enable the QR code to be scanned by the authentication device 120. The display device 114 may also present a user interface (e.g., a graphical user interface) for user input of authentication factors. In some embodiments, the user interface is a Web page loaded by the browser 112.

The primary device 110 may include a data repository 113 storing information about a session created for the user (e.g., a single sign-on (SSO) session). For example, the data repository 113 may store a session cookie 115 or an access token that is used by the browser 112 or some other application running on the primary device 110 for accessing a protected resource. The session can be created by a server of the AM system 130 (e.g., by the AM server 132 or another server in a different data center) in response to successful MFA based authentication of the user. The session may be configured with various properties such as a time period for which the session is valid. So long as the session remains valid, the session cookie 115 or access token may continue to be used for accessing resources protected by the AM system 130 without requiring the user to re-authenticate.

The authentication device 120 can be any computing device capable of generating a TOTP and communicating with the AM system 130 and in the manner described herein. In some embodiments, TOTPs are generated using a software authentication application 122 (e.g., an Oracle Mobile Authenticator (OMA) application). The authentication application 122 may be configured to generate TOTPs based on a current timestamp derived from a local clock of the authentication device 120 and further based on a shared secret 127 provided by the AM system 130. For example, the TOTP can be a random number generated by inputting the shared secret 127 and a timestamp into a hash function. Other ways to generate TOTPs are also possible.

The authentication device 120 may include an image capture device 124 (e.g., an integrated camera, a web cam, a barcode scanner, etc.) operable to capture an image of a QR code, e.g., by placing the image capture device 124 in front of the display device 114.

The authentication device 120 may further include a data repository 123 storing an authentication token, e.g., a JWT embedded in a QR code captured using the image capture device 124. As explained later, the authentication token can be used to establish to the AM system 130 that the authentication device 120 is a trusted device. The data repository 123 may further store the shared secret 127 and a public-private key pair 129 of the authentication device 120. A private key of the key pair 129 can be used to sign communications sent from the authentication device 120 to another device, e.g., to sign payloads of messages sent to the AM system 130 in connection with enrollment. A public key 138 of the key pair 129 can be used to verify that the communications are in fact from the authentication device 120.

The AM system 130 may include one or more servers configured to perform authentication (e.g., an AM server 132 configured to perform MFA) in response to access requests from the primary device 110. The AM server 132 can be a physical server or a virtual server. In some embodiments, the AM server 132 is an application server that protects one or more applications accessed through the browser 112 of the primary device 110. The AM server 132 may include an authentication token generator, e.g., a QR code generator 134 configured to generate a QR code containing a JWT or other type of authentication token. The authentication code can be signed using a private key of a public-private key pair 137 of the AM server 132. The QR code may also contain a URL identifying the AM server 132.

The AM server 132 may further include a TOTP generator 136, e.g., a software engine configured to execute the same hash function or algorithm by which the authentication application 122 generates TOTPs. For example, the TOTP generator 136 may generate a TOTP using a current timestamp (e.g., based on a local clock of the AM server 132) and the shared secret 127. The AM server 132 may include a data repository 133 for storing the shared secret 127, the server's key pair 137, and the public key 138 of the authentication device 120. The data repository 133 may further store user information 135 (e.g., a credential or other information by which a primary authentication factor supplied by the user can be verified). The data repository 133 may further store session information 139, such as a session identifier (ID), a session expiration time, and/or other session parameters.

Figure 2A:
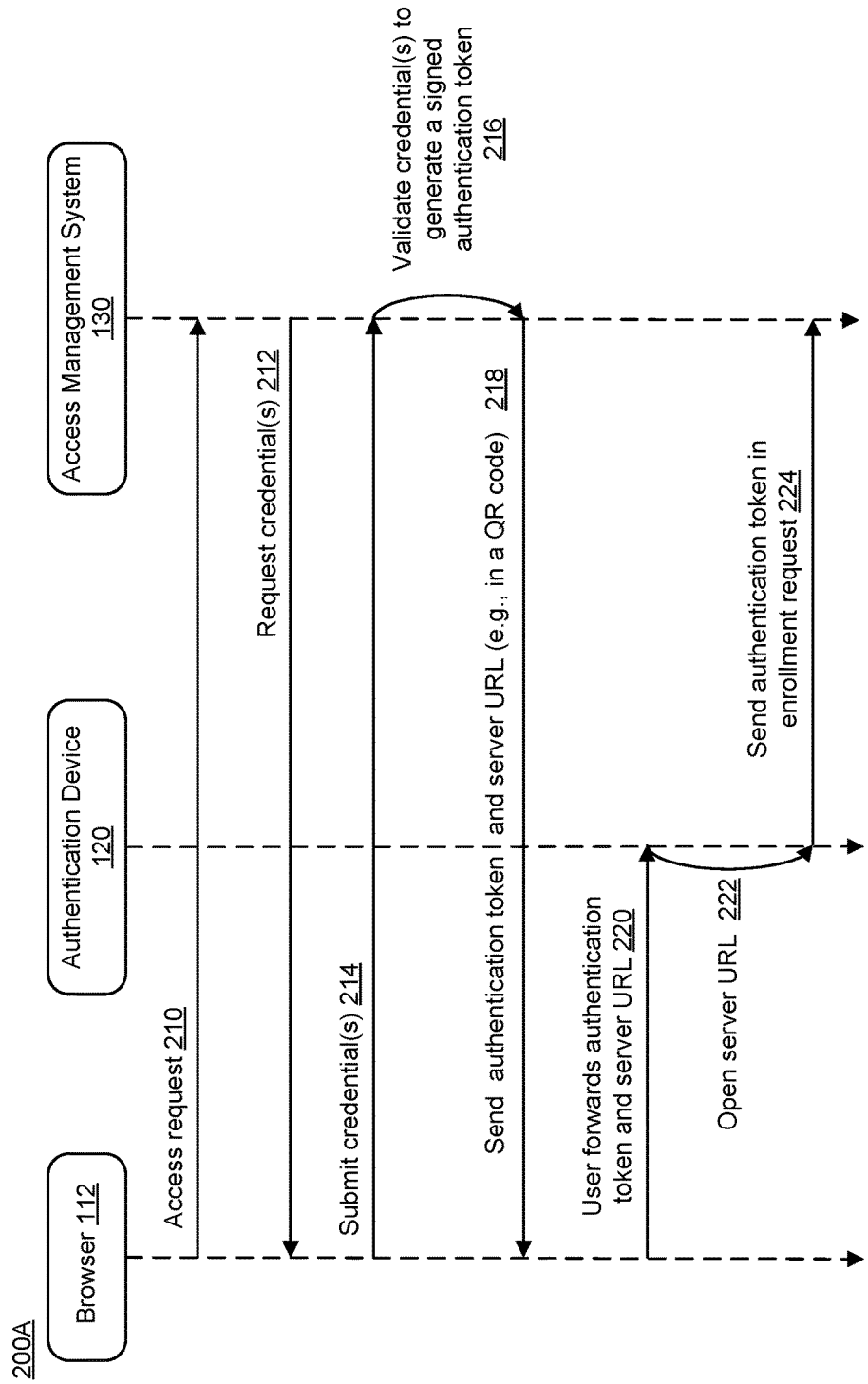
FIGS. 2A and 2B are sequence diagrams illustrating processes for enrolling an authentication device, in accordance with an embodiment.
Figure 2B:
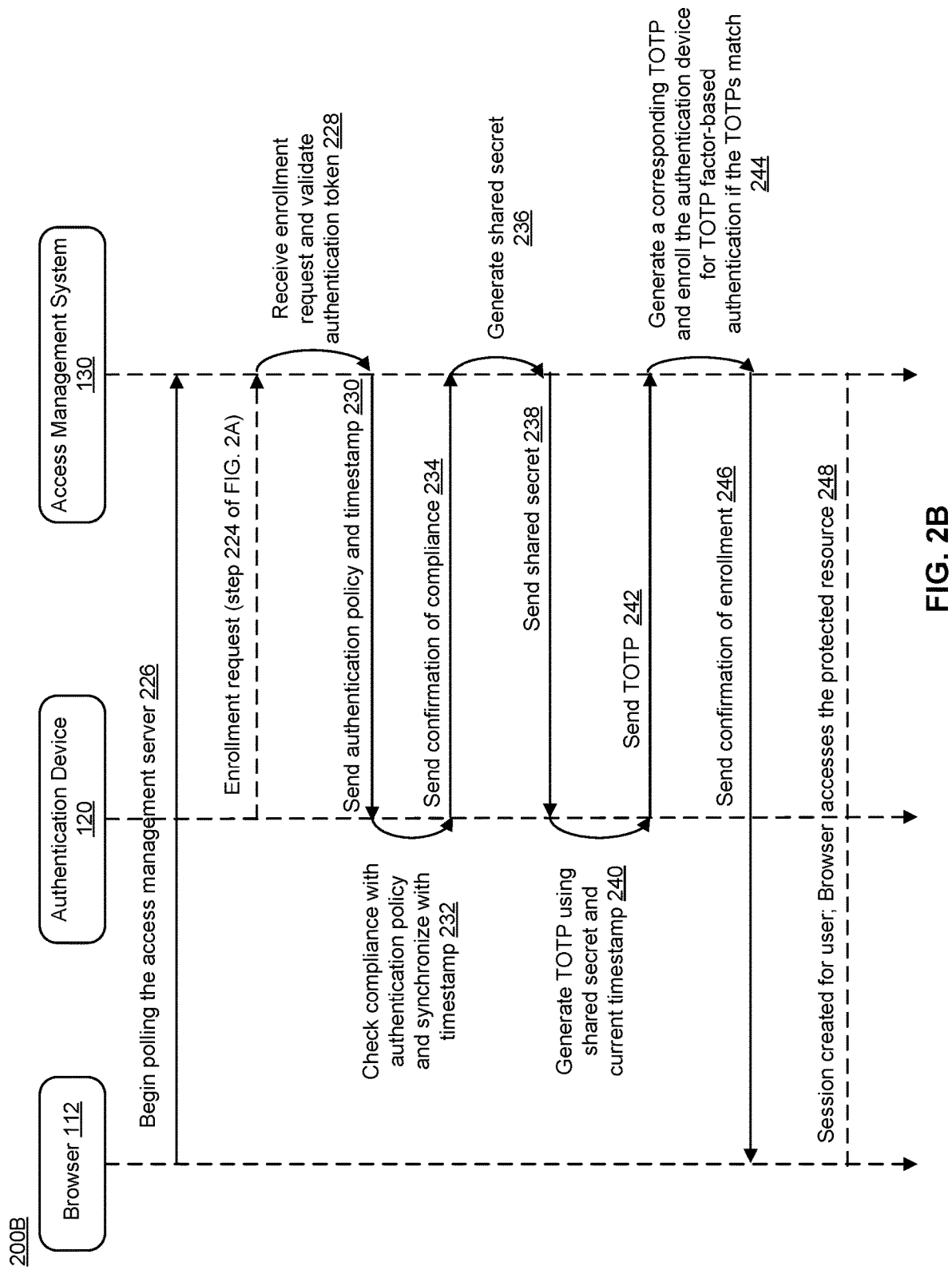

FIGS. 2A and 2B are sequence diagrams illustrating processes for enrolling an authentication device, in accordance with an embodiment. The processes of FIGS. 2A and 2B can be performed in the distributed environment 100.

FIG. 2A is a sequence diagram of a process 200A for generating information used by authentication device 120 to enroll with the AM system 130. At step 210, the browser 112 sends an access request to the AM system 130. The access request is then forwarded to the AM server 132 for processing.

At step 212, the AM server 132 requests, as a primary authentication factor, one or more credentials from the user (e.g., a user name and password). The AM server 132 may send the request for the credentials to the browser 112, e.g., by directing the browser to a Web page for submitting the requested credentials.

At step 214, the user submits the requested credential(s) through the browser 112.

At step 216, the AM server 132 validates the credential(s) to generate a signed authentication token. The authentication token can, for example, be a JWT signed using the AM server's private key or a server certificate. The JWT can include a set of claims (e.g., assertions made by the AM server 132) corresponding to information about the user and/or information about the time period in which the user is allowed to enroll the authentication device. For example, the claims can include user identifier information (e.g., a user ID), a unique device ID generated for the authentication device 132 by the AM server 132, an expiration time marking the end of a time period for enrollment (e.g., where the time period begins once the authentication token is sent to the browser in step 218) and claims identifying the issuer and audience. The issuer can be the AM server 132 or some other server that creates a session for the user, and the audience may correspond to the user whose credentials were validated in step 216.

At step 218, the AM server 132 sends the authentication token along with a URL of the server to the browser 112. The authentication token and the URL can be embedded in a QR code in order to facilitate communication of the authentication token and the URL to the authentication device 120. Data in the QR code may be encrypted. For example, the URL may be encrypted using percent encoding. The authentication token can be embedded in a registration link generated by combining the authentication token plus an authentication policy, plus the server URL, in which case the QR code may include the registration link. For the purposes of the present discussion, a registration link may be any set of data that specifies a URL or Uniform Resource Identifier (URI) that can be opened (e.g., via a Web browser) to access one or more computing resources for enabling registration or enrollment of a primary device and an associated authentication device. As an alternative to sending the authentication policy with the authentication token, the AM server 132 may send the authentication policy separately (e.g., in response to receiving an enrollment request containing the authentication token, as discussed below in reference to step 230 of FIG. 2B).

At step 220, the user forwards the authentication token and server URL, e.g., by scanning the QR code using the image capture device 124 of the authentication device 120. However, the use of QR codes is entirely optional. For example, the browser may cause the authentication token and/or the URL to be displayed in plaintext or via another mechanism such as a barcode. The authentication token and/or the URL can also be sent electronically to the authentication device through email, text messages, and other communication methods. Thus, in some embodiments, the QR code may only contain the authentication token while the URL is sent to the authentication device separately, e.g., through an email or a text message to enable the URL to be opened on the authentication device.

At step 222, the authentication device 120 opens the URL, e.g., using the authentication application 122 or a Web browser on the authentication device 120, thereby initiating contact with the AM server 132.

At step 224, the authentication device 120 sends the authentication token to the AM server 132 in an enrollment request. In some embodiments, the enrollment request comprises a registration link (or information from a registration link) previously obtained from the AM server 132 (e.g., in step 218) and a payload that has been digitally signed using the private key of the authentication device 120. The enrollment request may further include a public key of the authentication device 120, to be used for verifying the authenticity of subsequent messages sent from the authentication device 120 to the AM server 132. Enrollment may then proceed according to the process shown in FIG. 2B.

FIG. 2B is a sequence diagram of a process 200B for processing an enrollment request from the authentication device 120. At step 226, after the authentication token and the URL have been forwarded to the authentication device in step 220 of FIG. 2A, the browser 112 begins polling the AM server 132 to inquire as to whether enrollment has been successfully completed. The polling may comprise periodically contacting the AM server 132 for an enrollment status update.

At step 228, the AM server 132 receives the enrollment request and validates the authentication token. Validation of the authentication token can include checking whether the authentication token has been signed using the AM server's 132 private key, in order to confirm that the token has not been tampered with. Validation can also include checking whether the expiration time for enrollment has passed. If the expiration time has passed, the AM server 132 may deny the enrollment request and invalidate the authentication token and/or the URL so that the user will have to request that a new authentication token and/or a new URL be generated in order to reattempt enrollment. The AM server 132 may also check whether the user ID and the device ID in the authentication token match a user ID and device ID stored earlier by the AM server 132, e.g., a user ID generated for the user prior to the access request in step 210 of FIG. 2A and a device ID generated during creation of the authentication token in step 216. Additionally, the AM server 132 may check whether the issuer and audience claims in the authentication token match with earlier stored information to ensure that the authentication token is being presented on behalf of the same user whose credentials were validated in step 216 of FIG. 2A. If all of these checks pass successfully, the process continues to step 230.

In certain embodiments, the authentication token is validated by checking the claims of the authentication token to perform, in the following order: 1) token signature validation to make sure the token has not been tampered with, 2) a token issuer and audience check to make sure the token is issued by the correct issuer to the correct audience, 3) user and device identifier claims verification, and 4) a token expiry time check to invalidate expired registration links. These checks can also be performed in a different order.

At step 230, the AM server 132 sends an authentication policy and a current timestamp to the authentication device 120. The authentication policy may specify one or more security-related conditions that need to be satisfied with respect to the authentication device (e.g., a minimum operating system version, a minimum authentication application version, and a password protection requirement for the authentication device or for the authentication application).

At step 232, authentication device 120 checks for compliance with the authentication policy. The authentication device 120 also synchronizes with the timestamp. In some embodiments, the authentication device may automatically adjust a local clock of the authentication device to match the timestamp. In other embodiments, the authentication device may prompt the user to manually adjust the local time to match. In yet other embodiments, the authentication device may store a difference between a timestamp of the authentication device and the timestamp of the AM server 132 and take the difference into consideration when subsequently generating TOTPs, thereby avoiding having to adjust the local time.

At step 234, the authentication device 120 sends a confirmation of compliance with the authentication policy to the AM server 132.

At step 236, the AM server 132, in response to successful validation of the authentication token in step 228, and further in response to receiving the confirmation in step 234, generates a shared secret.

At step 238, the AM server 132 sends the shared secret to the authentication device. Upon receipt of the shared secret, the authentication device can begin generating TOTPs and can accept push notification requests for authentication or authorization purposes.

At step 240, the authentication device 120 generates a TOTP, e.g., by inputting a current timestamp and the shared secret to the authentication application.

At step 242, the authentication device 120 sends the TOTP generated in step 240 to the AM server 132 for verification.

At step 244, the AM server 132 generates a corresponding TOTP (e.g., using its own current timestamp and its own copy of the shared secret). The AM server 132 then compares the TOTP received from the authentication device 120 to the corresponding TOTP and if they match, the AM server 132 enrolls the authentication device for TOTP factor-based authentication. In particular, the AM server 132 may update a record to indicate that the authentication device 120 has been successfully enrolled and therefore authorized to generate TOTPs for use in authentication (e.g., for use as a secondary authentication factor in connection with MFA). Otherwise, if the TOTPs do not match, the AM server 132 may deny the enrollment request.

At step 246, the AM server 132 sends a confirmation of enrollment to the browser 112 in response to the polling that began in step 226. In response to receiving the confirmation of enrollment, the browser 112 may indicate to the user that the authentication device has been successfully enrolled. Thereafter, the next time the user needs to authenticate with the AM system 130, the AM system 130 may challenge the user for a TOTP (e.g., after successful authentication based on a primary authentication factor).

At step 248, a session is created for the user (e.g., by the AM server 132 or another server of the AM system 130) to enable the browser 112 to access the protected resource (e.g., based on a session cookie). The user may not be required to re-authenticate in connection with subsequent requests for access to a protected resource, so long as the session remains valid. If the user needs to re-authenticate, the authentication can be performed using a conventional MFA process (e.g., through user input of a primary authentication factor followed by user input of a secondary factor in the form of a TOTP generated by the authentication device 120). For re-authentication purposes, the authentication device 120 does not need to send the TOTP to the AM system 130 (in contrast to step 242, where the TOTP is sent to the AM server 132 for enrollment purposes). Instead, the authentication device may simply display the TOTP to enable the user to manually input the TOTP using the browser 112.

Figure 3:
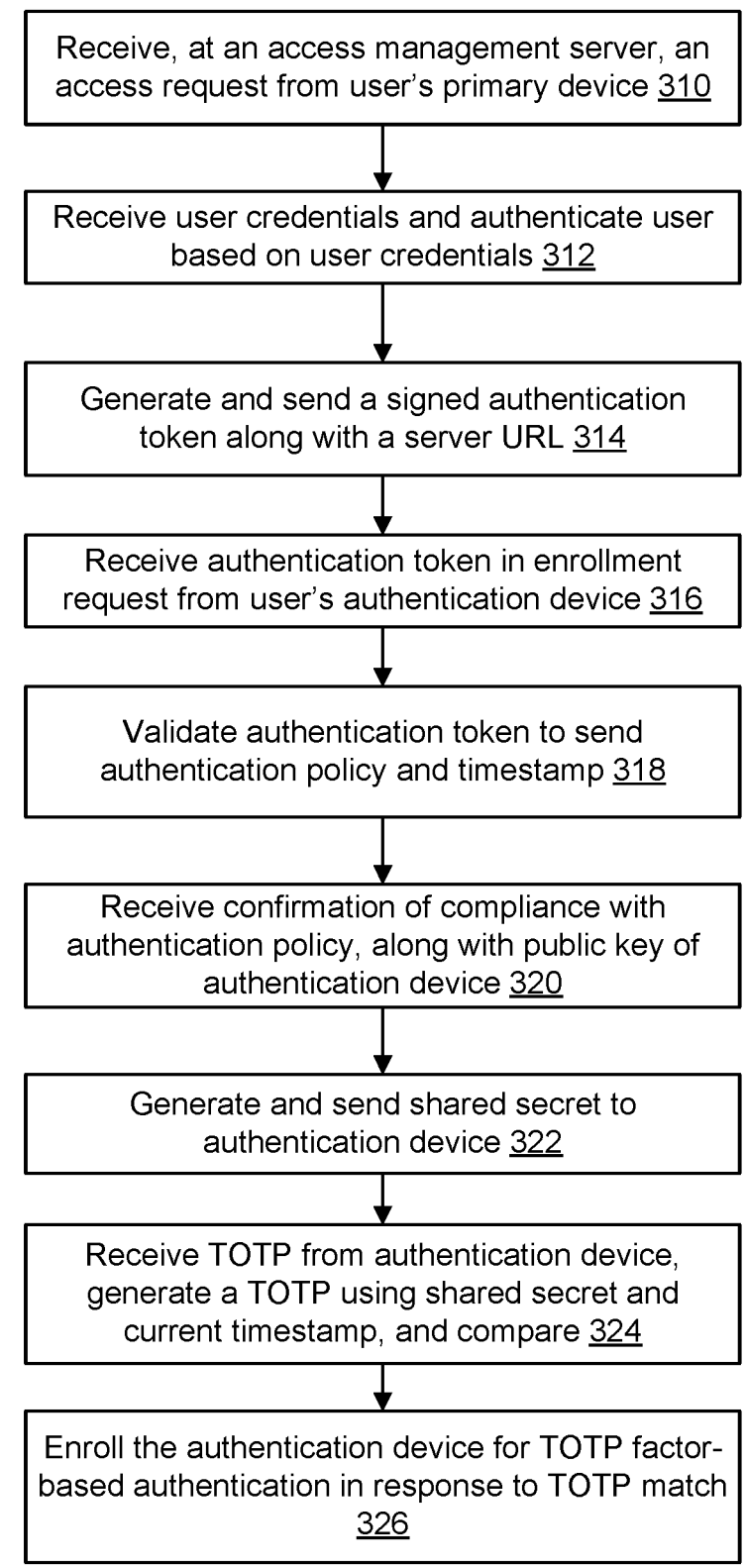
FIG. 3 is a flowchart of a method for enrolling an authentication device, in accordance with an embodiment.

FIG. 3 is a flowchart of a method 300 for enrolling an authentication device, in accordance with an embodiment. The method 300 can be performed by a server of an AM system, e.g., the AM server 132. At step 310, the AM server receives an access request from a user's primary device (e.g., an access request sent from the browser 112). In response, the AM server sends a request to the primary device for one or more credentials (or some other primary authentication factor).

At step 312, the AM server 132 receives the one or more user credentials and authenticates the user based on the user credentials (e.g., by comparing the received credentials to credentials that were stored for the user).

At step 314, the AM server generates and sends an authentication token along with a server URL to the primary device. The authentication token may include various items of information embedded as claims (e.g., a unique device ID generated for the user's authentication device by the AM server). The authentication token and the server URL can be sent in a QR code. In some embodiments, the AM server includes a registration link generator that generates a registration link by combining the authentication token with the server URL and an authentication policy. The authentication device can parse this registration link to contact the AM server at an address specified by the server URL. Alternatively, the authentication policy can be sent separately from the authentication token and server URL (e.g., in step 318).

At step 316, the AM server receives the authentication token back in an enrollment request sent from the user's authentication device.

At step 318, the AM server validates the authentication token (e.g., by checking that the authentication token has been signed using a private key of the AM server and/or performing any of the validation checks described above with respect to step 228 of FIG. 2B). In response to successful validation of the authentication token, the AM server may send the authentication policy (if not already sent in step 314) along with a current timestamp obtained from a local clock of the AM server. Validating the authentication token establishes the authentication device as a trusted device. However, the enrollment process is not yet complete and the authentication device cannot begin generating TOTPs at this point in time.

At step 320, the AM server receives a confirmation from the authentication device that the authentication device is compliant with the authentication policy. The AM server may also receive and store a public key of the authentication device. The AM server can use this key to verify the authenticity of subsequent messages that are signed using a private key of the authentication device.

At step 322, the AM server generates and sends a shared secret to the authentication device. The shared secret may be sent encrypted and can be, for example, a random number or string.

At step 324, the AM server receives a TOTP from the authentication device, generates its own TOTP using the shared secret and a current timestamp, then compares the two TOTPs to each other. If the TOTP received from the authentication device was generated using the same shared secret and the authentication device is time-synchronized with the AM server, then the two TOTPs will match.

At step 326, the AM server enrolls the authentication device for TOTP factor-based authentication in response to determining in step 324 that the TOTPs match. The enrollment process may include updating a record (e.g., a record associated with the unique device ID of the authentication device and further associated with the user ID of the user) to indicate that the authentication device has been granted permission to generate TOTPs for use in connection with MFA of the user.

Figure 4:
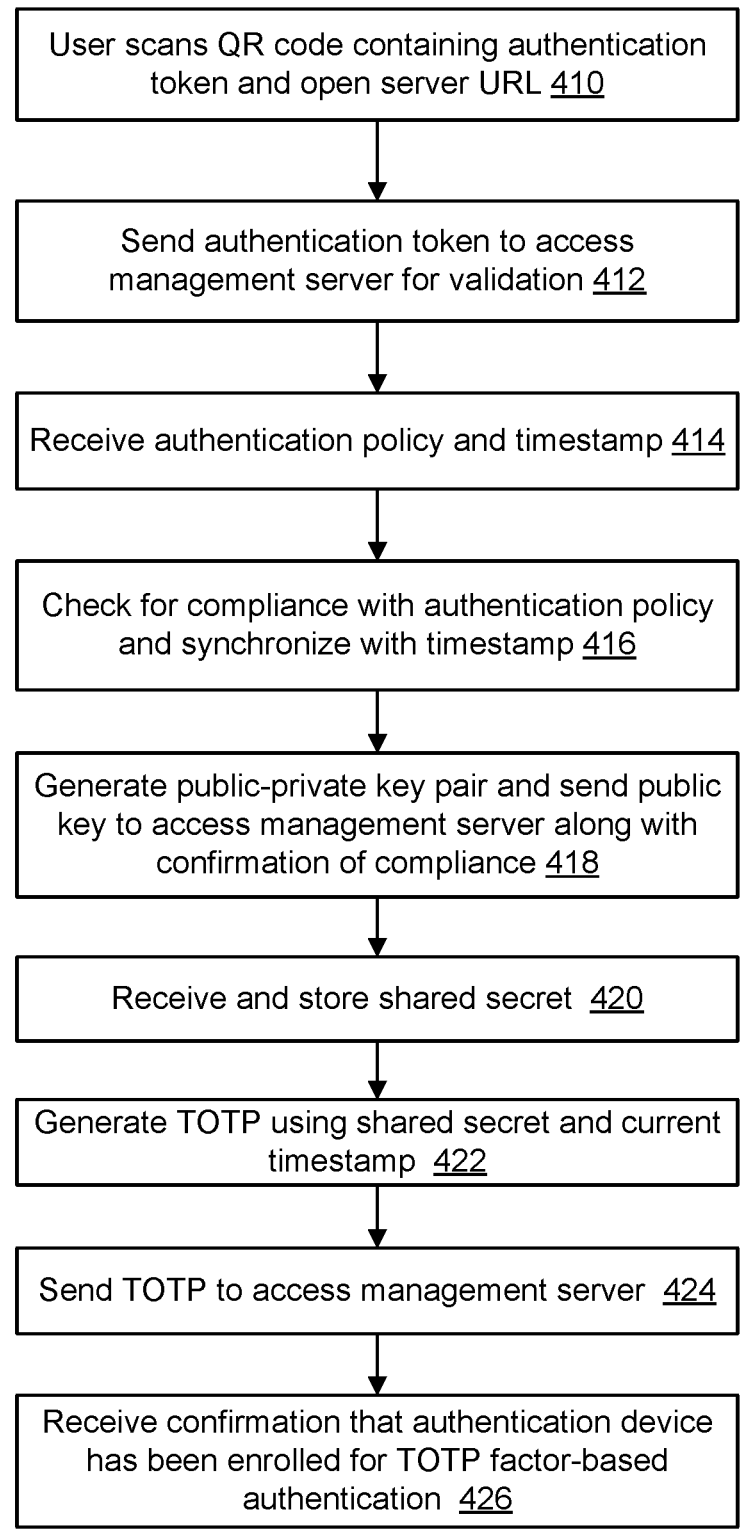
FIG. 4 is a flowchart of a method for enrolling an authentication device, in accordance with an embodiment.

FIG. 4 is a flowchart of a method 400 for enrolling an authentication device, in accordance with an embodiment.

The method 400 can be performed by an authentication device, e.g., the authentication device 120. At step 410, the user scans a QR code using an image capture device to send an authentication token and a server URL contained in the QR code to the authentication device. Alternatively, the user can send the authentication token and the server URL separately (e.g., by emailing the authentication token and/or the server URL). Additionally, as mentioned earlier in connection with FIG. 3, in some embodiments the QR code may be sent together with an authentication policy of an AM server (e.g., in a registration link). By scanning the QR code or otherwise instructing the authentication device to open the server URL, the user triggers an automated enrollment process in which no further user input is required in order to enroll the authentication device.

At step 412, the authentication device automatically sends the authentication token to an AM server (e.g., AM server 132) for validation.

At step 414, the authentication device receives an authentication policy and a timestamp from the AM server.

At step 416, the authentication device checks for compliance with the authentication policy (e.g., by checking software versions of the operating system and the authentication application installed on the authentication device) and also synchronizes with the timestamp.

At step 418, the authentication device generates a public-private key pair and sends the public key to the AM server to enable the AM server to verify the authenticity of subsequent messages that are sent from the authentication device and signed using the private key. For example, the TOTP in step 424 (discussed below) can be sent in a message signed using the private key. Along with the public key, the authentication device also sends a confirmation of compliance with the authentication policy.

At step 420, the authentication device receives a shared secret from the AM server and stores the shared secret in a data repository accessible to the authentication device.

At step 422, the authentication device generates a TOTP using the shared secret and a current timestamp obtained from a local clock of the authentication device.

At step 424, the authentication device sends the TOTP generated in step 422 to the AM server for verification against a TOTP generated by the server using the same shared secret.

At step 426, the authentication device receives from the AM server a confirmation that the authentication device has been enrolled for TOTP factor-based authentication. The confirmation may include details on the level of permission granted to the authentication device in connection with TOTP factor-based MFA. For example, the confirmation may indicate who the authentication device can generate TOTPs for (e.g., for a particular user ID) and how long the grant is valid for (e.g., an expiration time of the shared secret). The authentication device can now begin generating TOTPs in connection with MFA. For example, a subsequent request for a protected resource may require that the user supply the same primary authentication factor that was used for authentication during enrollment (e.g., one or more user credentials) together with a second authentication factor in the form of a TOTP.

Figure 5:
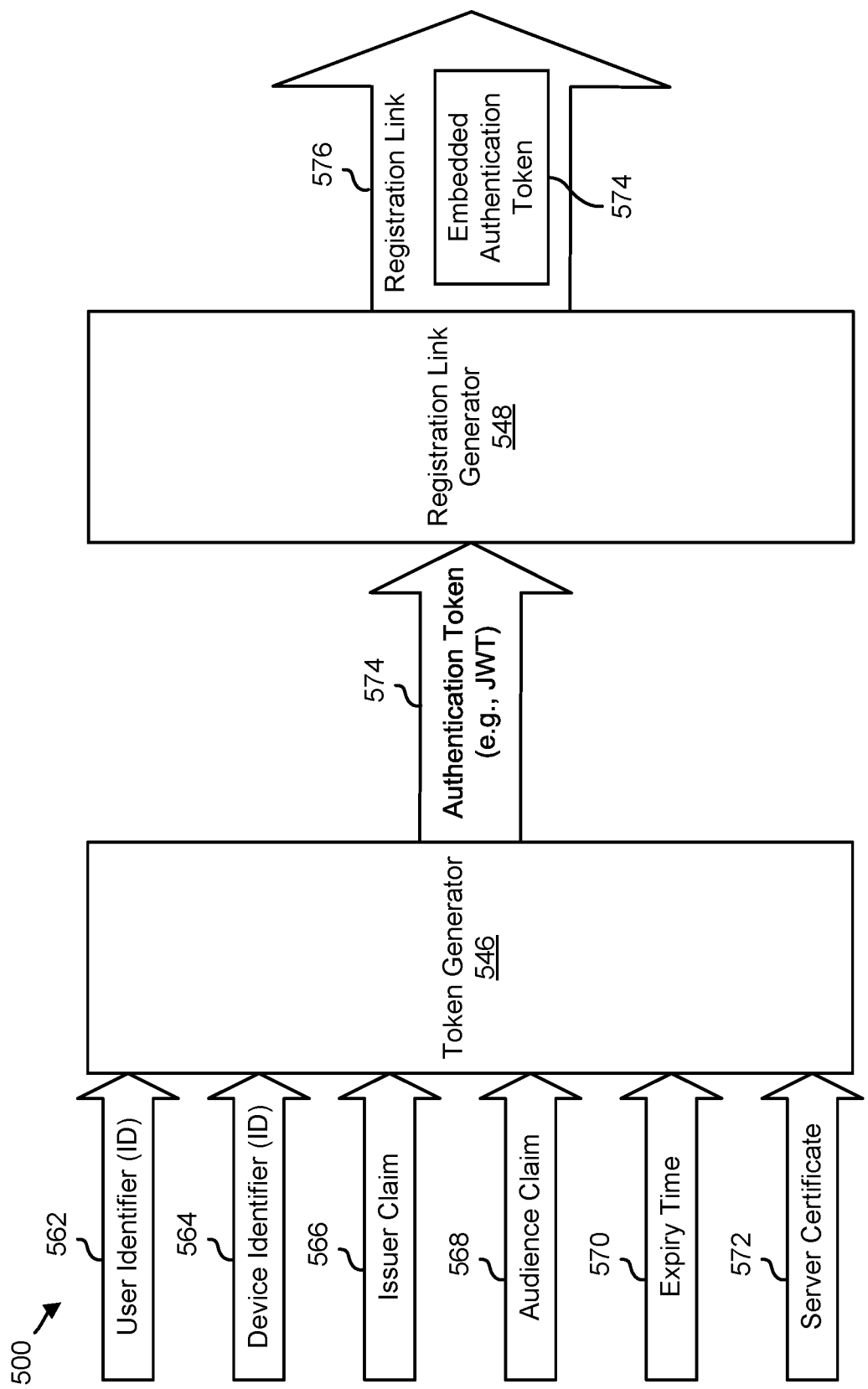
FIG. 5 illustrates a process of generating a registration link with an embedded authentication token, for implementing one or more embodiments.

FIG. 5 illustrates a process of generating a registration link with an embedded authentication token, for implementing one or more embodiments. The process shown in FIG. 5 can be used, for example, for generating and sending the authentication token and server URL in step 218 of FIG. 2A in the form of a registration link. The process begins with a set of inputs 500 and uses a token generator 546 to produce an authentication token 574, e.g., a JWT. The authentication token 574 is then embedded into a registration link 576 by a registration link generator 548. The token generator 546 and the registration link generator 548 may correspond to the QR code generator 134 in FIG. 1.

The token generator 546 receives as input a user ID 562, a server-generated (or otherwise server-maintained) client device ID 564, one or more issuer claims 566, one or more audience claims 568, a token expiry time 570, and a server certificate 572 (which may incorporate a server private key). The token generator 546 then combines the inputs to produce the authentication token 574.

The registration link generator 548 is configured to combine the authentication token 574, information describing an authentication policy (e.g., specifying one or more permissions applicable to a given client device and associated user), and a server URL that identifies a server that a client device (e.g., primary device 110) should contact for purposes of enrolling an authentication device (e.g., authentication device 120) in order to enable the authentication device to facilitate subsequent user access (e.g., via MFA) to one or more protected resources.

The resultant registration link 576 and accompanying embedded authentication token 574 can then be sent to the client device for further use, e.g., for forwarding to the authentication device in step 220 of FIG. 2A.

Figure 6:
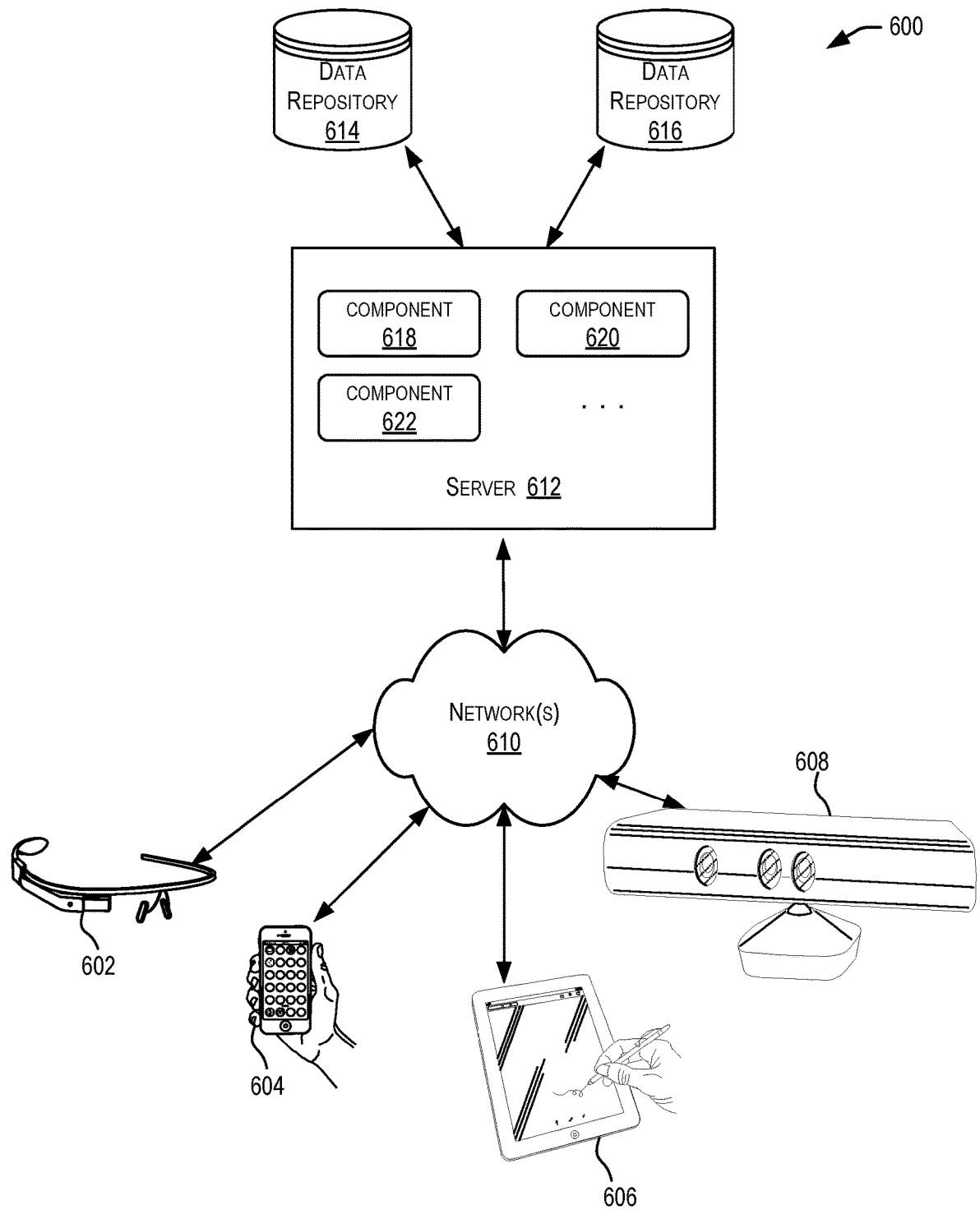
FIG. 6 is a simplified diagram of a distributed system for implementing one or more embodiments.

FIG. 6 depicts a simplified diagram of a distributed system 600 for implementing one or more embodiments. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications (e.g., browser 112 or authentication application 122).

In certain embodiments, server 612 may be adapted to run one or more services or software applications that enable enrollment of an authentication device for generating TOTPs. For example, server 612 may correspond to the access management server 132 of FIG. 1.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to enroll one of the client computing devices 602, 604, 606, and/or 608 for generating TOTPs in connection with a request from another one of one of the client computing devices 602, 604, 606, and/or 608 for accessing a protected resource, in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store information used in connection with enrollment of an authentication device and/or in connection with access requests. For example, the data repositories 614, 616 may store session cookies, authentication tokens, encryption keys, etc. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of the data repositories 614, 616 may also be used by applications to store application data. The data repositories used by applications may be of different types such as, for example, a key-value store repository, an object store repository, or a general storage repository supported by a file system.

Figure 7:
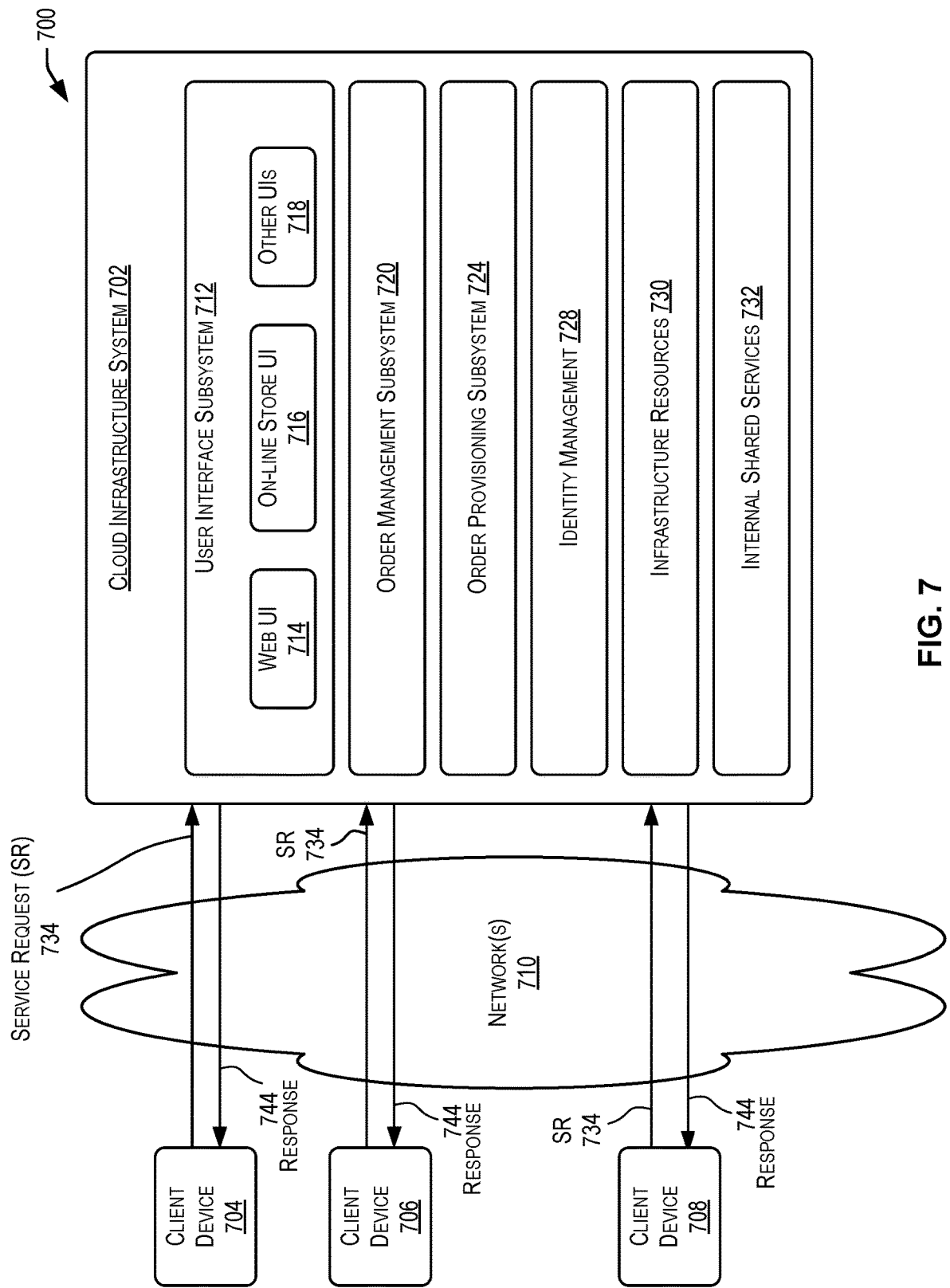
FIG. 7 is a simplified block diagram of a cloud-based system environment in which various storage-related services may be offered as cloud services, in accordance with certain embodiments.

In certain embodiments, the enrollment or MFA-related functionalities described in this disclosure may be offered as services via a cloud environment. FIG. 7 is a simplified block diagram of a cloud-based system environment 700 in which various enrollment and WA-related services may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, the enrollment an authentication device, the installation of an authentication application on the authentication device, and the provisioning of access to a requested resource may be handled through subscription orders. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request an enrollment or MFA-related service described in this disclosure.

In some embodiments, the processing performed by cloud infrastructure system 702 for providing enrollment or MFA-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for selecting or determining an MFA factor based on data collected about the user. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for an enrollment-related service offered by cloud infrastructure system 702. As part of the order, the customer may provide information identifying the customer (e.g., a username and password) and information identifying a platform of the authentication device (e.g., an Android or iOS operating system).

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the enrollment or MFA-related service, the response may include an authentication token (e.g., a JWT) generated based in part on information about the customer.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
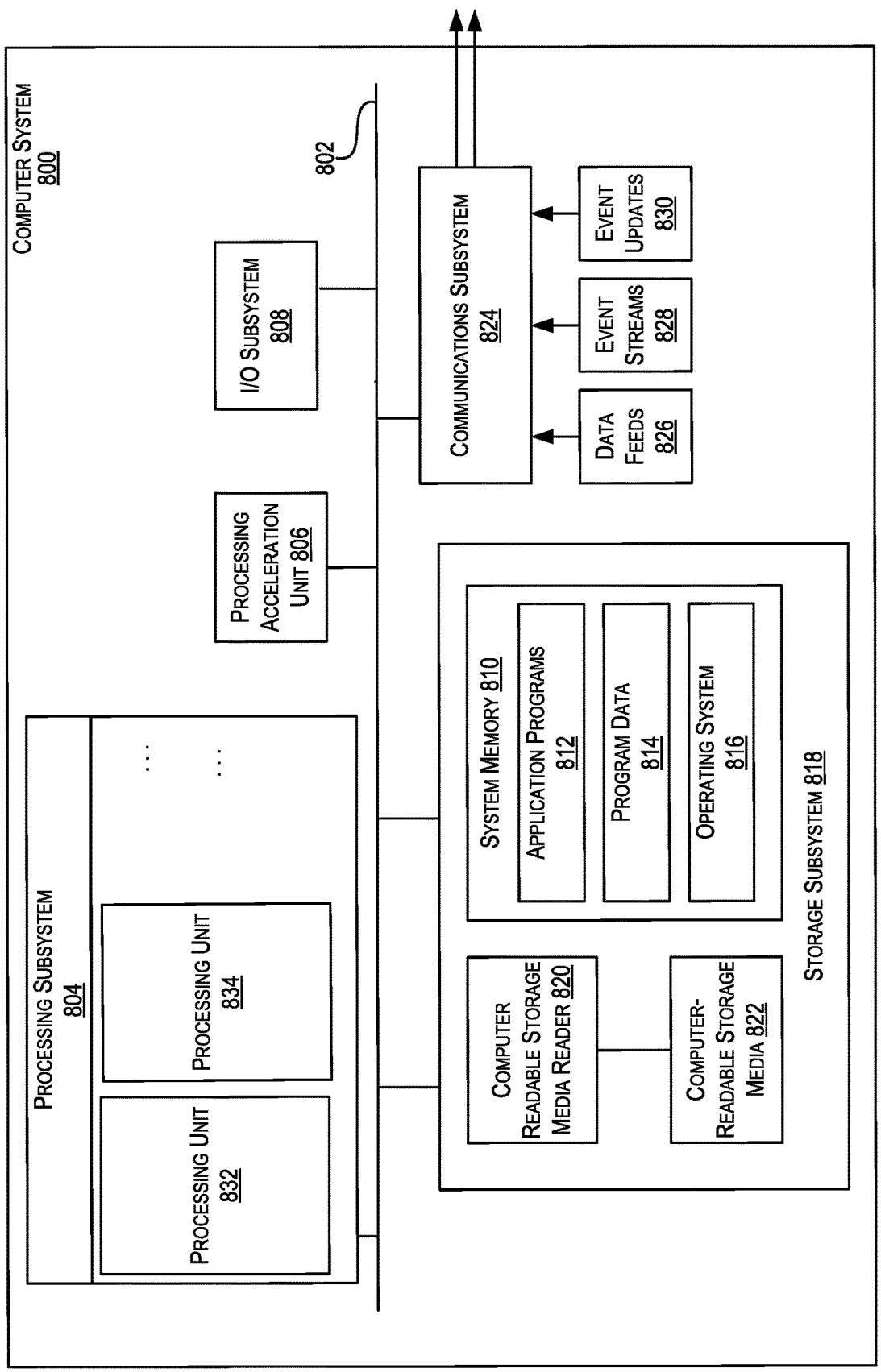
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of the user primary devices, authentication devices, access management systems, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used for secured communication (e.g., communications encrypted using public and private keys) of TOTPs between an authentication device and an access management server.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising performing the following by one or more processors of an access management system:
   receiving, at the access management system, an enrollment request from an authentication device of a user, the enrollment request including an authentication token generated by the access management system in response to a successful authentication based on a first authentication request for the user;
   validating the authentication token;
   sending a shared secret to the authentication device in response to the validating of the authentication token;
   after sending the shared secret, receiving a first passcode from the authentication device, the first passcode being generated and sent by the authentication device in response to receiving the shared secret from the access management system, wherein the first passcode is a time-based one-time password (TOTP) generated by the authentication device using the shared secret and a time value;
   generating a second passcode using the shared secret;
   comparing the first passcode to the second passcode; and
   responsive to determining that the first passcode matches the second passcode, enrolling the authentication device with the access management system, the enrolling comprising updating, by the access management system, a record to indicate that the authentication device has been granted permission to generate passcodes in connection with subsequent authentication requests for the user.

2. The method of claim 1, wherein the enrollment request is a request to enroll the authentication device for generating passcodes in connection with a subsequent multi-factor authentication request for the user.

3. The method of claim 1, wherein the time value is a value of a local time of the authentication device.

4. The method of claim 3, further comprising:
   sending a timestamp to the authentication device, wherein the authentication device is time-synchronized with the access management system based on the timestamp.

5. The method of claim 1, further comprising:
   after the enrolling of the authentication device, receiving a first TOTP from the authentication device in connection with a subsequent authentication request for the user, the first TOTP being generated by the authentication device using the shared secret;
   generating a second TOTP using the shared secret;
   comparing the first TOTP to the second TOTP; and
   responsive to determining that the first TOTP matches the second TOTP, granting access to a protected resource.

6. The method of claim 1, wherein the authentication token is a JavaScript Object Notation (JSON) Web Token.

7. The method of claim 1, further comprising:
   sending an authentication policy to the authentication device;
   receiving a response from the authentication device indicating whether the authentication device is compliant with the authentication policy; and
   determining, based on the response from the authentication device, that the authentication device is compliant, wherein the sending of the shared secret is in response to the determining that the authentication device is compliant.

8. The method of claim 1, further comprising:
sending the authentication token together with a uniform resource locator (URL) to a second computing device of the user in response to the successful authentication based on the first authentication request, wherein the enrollment request is sent from the authentication device to the access management system in response to receiving the authentication token and the URL from the second computing device.

9. The method of claim 8, further comprising:
sending a confirmation to the second computing device, the confirmation indicating that the authentication device has been successfully enrolled, wherein the confirmation is sent after the enrolling of the authentication device and in response to polling of the access management system by the second computing device.

10. The method of claim 8, further comprising:
after the enrolling of the authentication device, granting the second computing device access to a protected resource, wherein the first authentication request was triggered by an access request from the second computing device for the protected resource.

11. A system comprising:
one or more processors; and
a memory storing instructions which when executed by the one or more processors, cause the one or more processors to:
receive an enrollment request from an authentication device of a user, the enrollment request including an authentication token generated by the system in response to a successful authentication based on a first authentication request for the user;
validate the authentication token;
send a shared secret to the authentication device in response to the validating of the authentication token;
after sending the shared secret, receive a first passcode from the authentication device, the first passcode being generated and sent by the authentication device in response to receiving the shared secret from the system, wherein the first passcode is a time-based one-time password (TOTP) generated by the authentication device using the shared secret and a time value;
generate a second passcode using the shared secret;
compare the first passcode to the second passcode; and
responsive to determining that the first passcode matches the second passcode, enroll the authentication device with the system, the enrolling comprising updating a record to indicate that the authentication device has been granted permission to generate passcodes in connection with subsequent authentication requests for the user.

12. The system of claim 11, wherein the enrollment request is a request to enroll the authentication device for generating passcodes in connection with a subsequent multi-factor authentication request for the user.

13. The system of claim 11, wherein the time value is a value of a local time of the authentication device.

14. The system of claim 13, wherein the instructions further cause the one or more processors to:
send a timestamp to the authentication device, wherein the authentication device is time-synchronized with the system based on the timestamp.

15. The system of claim 11, wherein the instructions further cause the one or more processors to:
after the enrolling of the authentication device, receive a first TOTP from the authentication device in connection with a subsequent authentication request for the user, the first TOTP being generated by the authentication device using the shared secret;
generate a second TOTP using the shared secret;
compare the first TOTP to the second TOTP; and
responsive to determining that the first TOTP matches the second TOTP, grant access to a protected resource.

16. The system of claim 11, wherein the authentication token is a JavaScript Object Notation (JSON) Web Token.

17. The system of claim 11, wherein the instructions further cause the one or more processors to:
send an authentication policy to the authentication device;
receive a response from the authentication device indicating whether the authentication device is compliant with the authentication policy; and
determine, based on the response from the authentication device, that the authentication device is compliant, wherein the sending of the shared secret is in response to the determining that the authentication device is compliant.

18. The system of claim 11, wherein the instructions further cause the one or more processors to:
send the authentication token together with a uniform resource locator (URL) to a second computing device of the user in response to the successful authentication based on the first authentication request, wherein the enrollment request is sent from the authentication device to the system in response to receiving the authentication token and the URL from the second computing device.

19. The system of claim 18, wherein the instructions further cause the one or more processors to:
send a confirmation to the second computing device, the confirmation indicating that the authentication device has been successfully enrolled, wherein the confirmation is sent after the enrolling of the authentication device and in response to polling of the system by the second computing device.

20. A non-transitory computer-readable storage medium storing instructions which when executed by one or more processors, cause the one or more processors to:
receive an enrollment request from an authentication device of a user, the enrollment request including an authentication token generated by the one or more processors in response to a successful authentication based on a first authentication request for the user;
validate the authentication token;
send a shared secret to the authentication device in response to the validating of the authentication token;
after sending the shared secret, receive a first passcode from the authentication device, the first passcode being generated and sent by the authentication device in response to receiving the shared secret from the one or more processors, wherein the first passcode is a time-based one-time password (TOTP) generated by the authentication device using the shared secret and a time value;
generate a second passcode using the shared secret;
compare the first passcode to the second passcode; and
responsive to determining that the first passcode matches the second passcode, enroll the authentication device, the enrolling comprising updating a record to indicate that the authentication device has been granted permission to generate passcodes in connection with subsequent authentication requests for the user.

* * * * *